US012246531B2

(12) United States Patent
Schweid et al.

(10) Patent No.: US 12,246,531 B2
(45) Date of Patent: Mar. 11, 2025

(54) SYSTEM AND METHOD FOR USING PRINTHEAD ROTATION TO SECURE INKJET PRINTING

(71) Applicant: Xerox Corporation, Norwalk, CT (US)

(72) Inventors: Stuart A. Schweid, Pittsford, NY (US); David A. VanKouwenberg, Avon, NY (US); Martin L Frachioni, Rochester, NY (US); Linn C. Hoover, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 254 days.

(21) Appl. No.: 18/156,135

(22) Filed: Jan. 18, 2023

(65) Prior Publication Data

US 2024/0239115 A1 Jul. 18, 2024

(51) Int. Cl.

| | |
|---|---|
| ***B41J 11/00*** | (2006.01) |
| ***B41J 2/045*** | (2006.01) |
| ***B41J 2/21*** | (2006.01) |
| *B41M 3/14* | (2006.01) |
| *B42D 25/00* | (2014.01) |
| *B42D 25/30* | (2014.01) |
| *B42D 25/309* | (2014.01) |

(52) U.S. Cl.

CPC ......... *B41J 11/008* (2013.01); *B41J 2/04505* (2013.01); *B41J 2/2114* (2013.01); *B41M 3/14* (2013.01); *B42D 25/00* (2014.10); *B42D 25/30* (2014.10); *B42D 25/309* (2014.10)

(58) Field of Classification Search

CPC .... B41J 11/008; B41J 2/04505; B41J 2/2114; B41M 3/14; B42D 25/00; B42D 25/30; B42D 25/309

See application file for complete search history.

(56) References Cited

U.S. PATENT DOCUMENTS

| | | | |
|---|---|---|---|
| 9,628,662 B1 | 4/2017 | Emmett et al. | |
| 10,999,466 B1 | 5/2021 | Chapman | |
| 2007/0068402 A1* | 3/2007 | Sanchez | H04N 1/0323 101/93.42 |
| 2019/0297221 A1* | 9/2019 | Chapman | G06T 11/20 |
| 2019/0354994 A1* | 11/2019 | Soborski | G06K 5/00 |
| 2020/0336623 A1 | 10/2020 | Chapman | |

* cited by examiner

*Primary Examiner* — Henok D Legesse

(74) *Attorney, Agent, or Firm* — Maginot Moore & Beck LLP

(57) ABSTRACT

A method of inkjet printer operation produces a security pattern in a printed document. In one embodiment, the security feature is printed in the document as a line target with printheads that have been rotated so the rows of inkjets in the printhead are not aligned in the cross-process direction. The line target in the original document has a frequency response to that differs from a copy formed with a device that does not have rotated printheads. In another embodiment, a sneeze pattern is modified by shifting pixels of at least one color separation in the sneeze pattern in a cross-process direction or a process direction. A copy is identified because it does not contain the shifted pixels.

22 Claims, 12 Drawing Sheets

SYSTEM AND METHOD FOR USING PRINTHEAD ROTATION TO SECURE INKJET PRINTING

TECHNICAL FIELD

This disclosure is directed to printers that print documents containing security features and, more particularly, to the printing of the security features so they are not humanly perceptible.

BACKGROUND

Inkjet imaging devices eject liquid ink from printheads to form images on an image receiving surface. The printheads include a plurality of inkjets that are arranged in some type of array. Each inkjet has a thermal or piezoelectric actuator that is coupled to a printhead driver. The printhead controller generates firing signals that correspond to digital data for images. Actuators in the printheads respond to the firing signals by expanding into an ink chamber to eject ink drops onto an image receiving member and form an ink image that corresponds to the digital image used to generate the firing signals.

Security features are elements printed in a document that are not part of the ink image content data for a document. As used in this document, the term "ink image content data" means digital data that identifies a color and a volume of each ejected ink drop that forms pixels in a humanly perceptible ink image to be printed on a media sheet. A security feature typically appears in the original of a printed when viewed under certain predetermined lighting conditions but they do not appear in a copy under those same lighting conditions. These security features permit a holder of a printed document to determine whether they possess an original document or a copy Printing documents with security features is a popular anti-counterfeiting and anti-forging method that protects valuable documents, such as prescriptions and concert tickets.

Typically, security features are added to the ink image content data for a document to be printed and are formed with drops of ink that are different than the inks used to form the ink image of the document produced using the ink image content data. The inks used for the security features usually have glosses or infrared properties that differ from the inks used to print the humanly perceptible content of a document. Thus, these types of security features require additional reservoirs and printheads for the special inks used to form the security features. Being able to form security features with the inks typically used to form humanly perceptible content of a document without making the security features discernible in the original would be beneficial.

SUMMARY

A new method of operating an inkjet printer forms security marks with the inks typically used to form humanly perceptible content of a document without making the security features discernible. The method includes printing a line target in an ink image of the original document on media with at least one printhead that has been rotated so rows of inkjets in the at least one printhead are not aligned in a direction of movement during printing of the line target; generating an expected frequency response of the line target; generating image data of a document; generating a frequency response of the line target in the image data of the document; and identifying the document as the original document when the frequency response of the line target in the image data of the document equals the expected frequency response of the line target.

A new inkjet printer forms security marks with the inks typically used to form humanly perceptible content of a document without making the security features discernible. The inkjet printer includes a media transport configured to carry media sheets through the inkjet printer; at least one printhead that has been rotated so rows of inkjets in the at least one printhead are not aligned in a direction of movement during printing of the line target and the at least one printhead is configured to eject ink drops onto the media sheets; a controller operatively connected to the at least one printhead. The controller is configured to: print a line target in an ink image of an original document on media with the at least one printhead; generate an expected frequency response of the line target; generate image data of a document; generate a frequency response of the line target in the image data of the document; and identify the document as the original document when the frequency response of the line target in the image data of the document equals the expected frequency response of the line target.

Another new method of operating an inkjet printer forms security marks with the inks typically used to form humanly perceptible content of a document without making the security features discernible. The method includes generating a sneeze pattern having a plurality of color separations; modifying a portion of the sneeze pattern by altering positions of pixels within the generated sneeze pattern; printing the original document with the sneeze pattern having the modified portion in the background of the original document; generating image data of a document; and identifying the document as the original document when the modified portion of the generated sneeze pattern is detected in the background of the document.

Another new inkjet printer forms security marks with the inks typically used to form humanly perceptible content of a document without making the security features discernible. The inkjet printer includes a media transport configured to carry media sheets through the inkjet printer; at least one printhead configured to eject ink drops onto the media sheets as the media sheets pass the at least one printhead; a controller operatively connected to the at least one printhead. The controller is configured to: generate a sneeze pattern having a plurality of color separations; modify a portion of the sneeze pattern by altering positions of pixels within the generated sneeze pattern; print an original document with the sneeze pattern having the modified portion in a background of the original document; generate image data of a document; and identify the document as the original document when the modified portion of the generated sneeze pattern is detected in the background of the document.

BRIEF DESCRIPTION OF THE DRAWINGS

The foregoing aspects and other features of an inkjet printer and its method of operation to form security marks with the inks typically used to form humanly perceptible content of a document without making the security features discernible are explained in the following description, taken in connection with the accompanying drawings.

DETAILED DESCRIPTION

Figure 1:
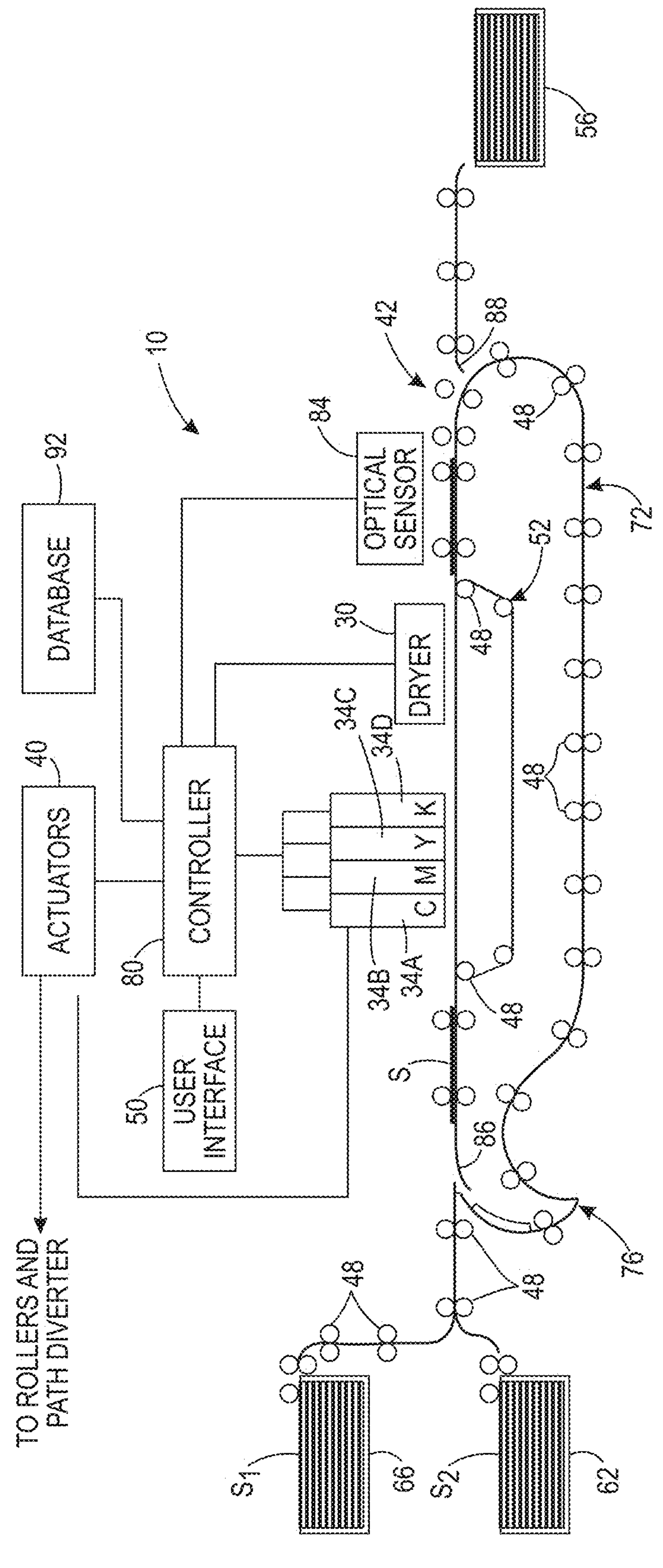
FIG. 1 depicts an inkjet printer that forms security marks with the inks typically used to form humanly perceptible content of a document without making the security features discernible.

For a general understanding of the environment for the system and method disclosed herein as well as the details for the system and method, reference is made to the drawings. In the drawings, like reference numerals have been used throughout to designate like elements. As used herein, the word "inkjet printer" encompasses any apparatus that produces ink images on media by operating inkjets in printheads to eject drops of ink toward the media. As used herein, the term "process direction" refers to a direction of travel of an image receiving surface, such as an imaging drum or print media, and the term "cross-process direction" is a direction that is substantially perpendicular to the process direction along the surface of the image receiving surface. Also, a reader of the description presented below that is directed to a system for operating inkjets in an inkjet printer should appreciate that the principles set forth in this description are applicable to similar imaging devices that generate images with pixels of other types of marking material.

The printer and method described below form security marks with the inks typically used to form humanly perceptible content of a document without making the security features discernible. By rotating the printheads about an axis perpendicular to the faceplate of the printhead by a small amount and printing a line target in the image content of the document, a security feature is formed that is detectable from a Fourier transform of the document. The reason that the security feature is not reproduced in a copy of the document is that the copying device quantizes the positions of the pixels in the copy so the security feature does not produce the same frequency response. The only way that the copier can reproduce the security feature is to replicate the rotation of the printheads that produced the original security feature in the copying device. Thus, a very small risk exists that a security feature so produced can be reproduced in a copy.

FIG. 1 depicts a high-speed color inkjet printer 10 that forms security marks with the inks typically used to form humanly perceptible content of a document without making the security features discernible. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise a portion of the media transport 42 that passes through the print zone PZ (shown in FIG. 2) of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

As shown in FIG. 1, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80 to identify image quality issues in the printed images generated by the printer. The optical sensor 84 can be a digital camera, an array of LEDs and photodetectors, or other devices configured to generate image data of a passing surface. As already noted, the media transport also includes a duplex path that can turn a sheet over and return it to the transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Additionally, a previously known process generates a uniform sneeze pattern that is also printed in the image area of the media sheet. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image containing the image content and the sneeze pattern to be printed on a media sheet.

Figure 2:
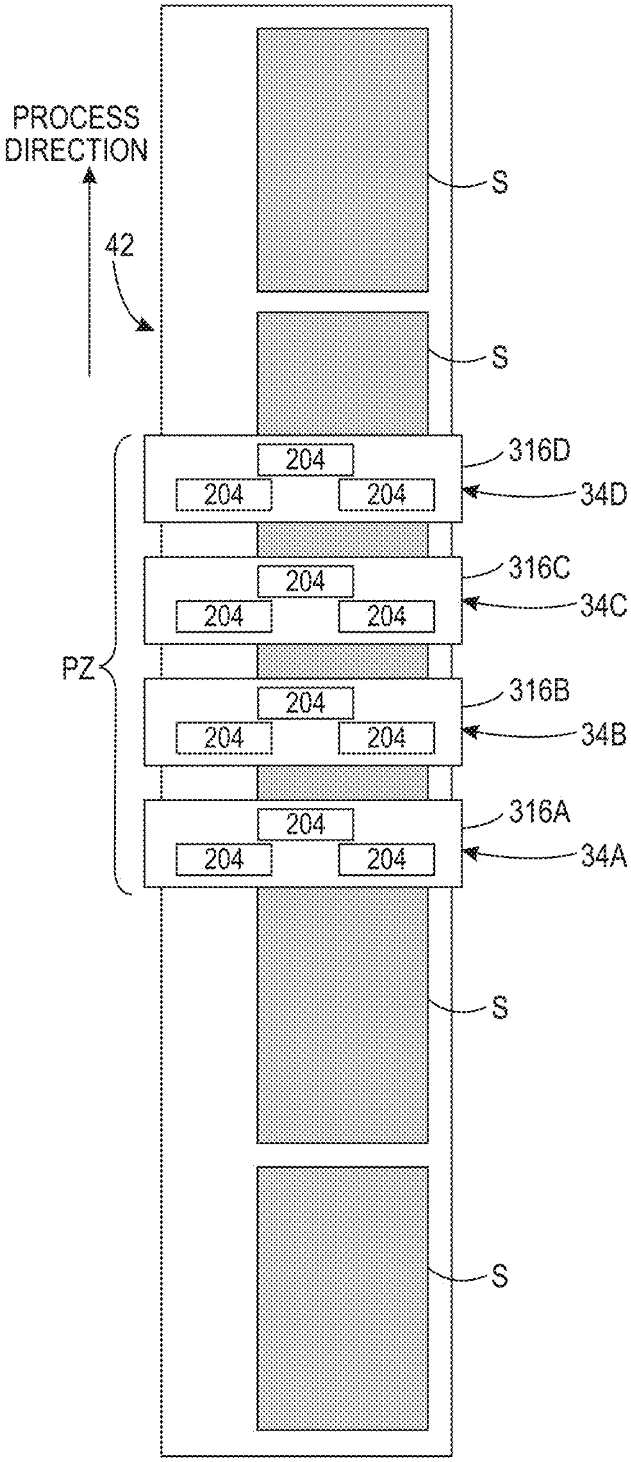
FIG. 2 is a top view of the print zone of the printer shown in FIG. 1

The print zone PZ in the printer 10 of FIG. 1 is shown in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 has three printheads 204 mounted to one of the printhead carrier plates 316A, 316B, 316C, and 316D, respectively.

Figure 3:
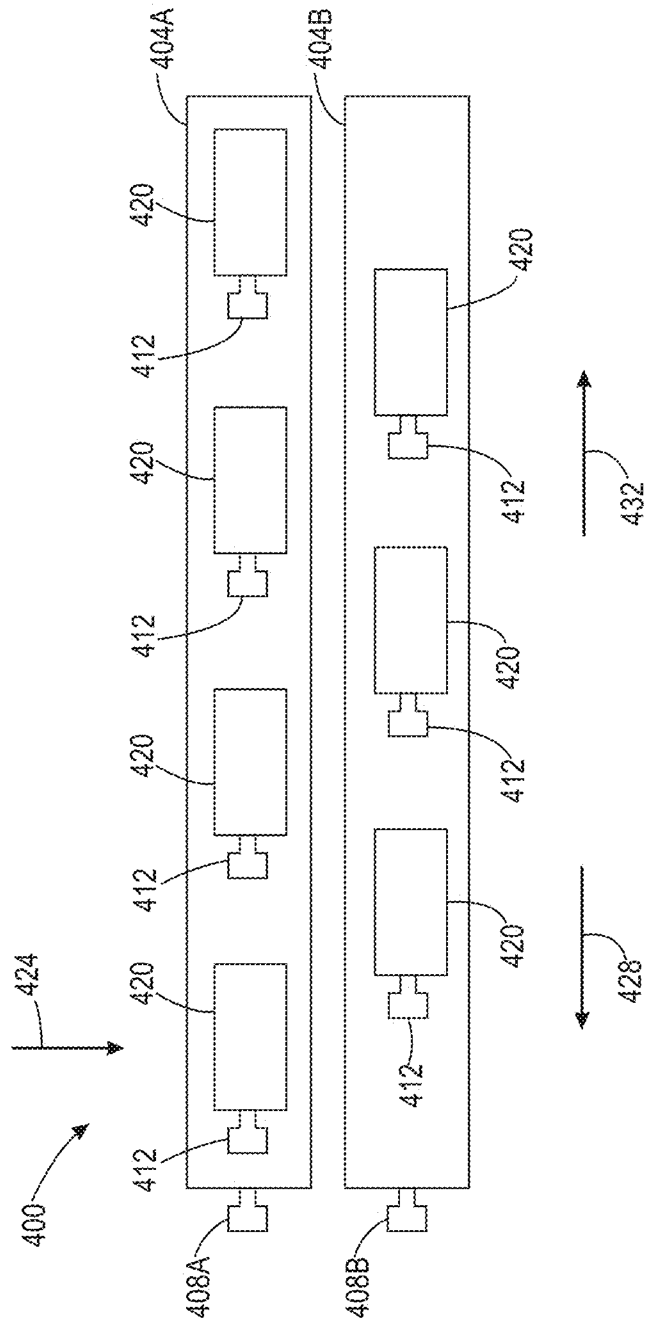
FIG. 3 is one embodiment of two print bars in the print zone of FIG. 2.

FIG. 3 depicts a configuration for a pair of print bars that may be used in the print zone PZ of printer 10. The print bars 404A and 404B are operatively connected to the print bar motors 408A and 408B, respectively, and a plurality of printheads 420 are mounted to the print bars. The motors 408A, 408B, and 412 are operatively connected to the controller 80 so the controller can independently operate the motors. Each printhead 420 is operatively connected to an electrical motor 412. Each print bar motor 408A and 408B moves the print bar operatively connected to the motor in either of the cross-process directions 428 or 432. The printheads 420 are arranged in a staggered array to allow inkjet ejectors in the printheads to print a continuous line in the cross-process direction across media passing by the printheads. Movement of a print bar by an actuator 408A or 408B causes all of the printheads mounted on the print bar to move an equal distance in one of the cross-process directions Each of printhead motors 412 rotates the printhead operatively connected to the motor about an axis that is perpendicular of the plane of the figure and that passes through the center of the printhead. Motors 412, 408A, and 408B are electromechanical stepper motors capable of rotating a shaft in a series of one or more discrete steps. Each step rotates the shaft a predetermined angular distance and the motors may rotate in either a clockwise or counter-clockwise direction. The rotating shafts of motors 408A and 408B turn drive screws that translate the print bars 404A and 404B, respectively, in one of the cross-process directions 428 and 432, while the rotating shafts of motors 416 rotate the printheads about the axis as previously described.

Printheads in inkjet printers are formed with multiple rows that span at least several millimeters. In order to have equal 1200 dot per inch (dpi) spacing between adjacent pixels in a cross-process line, the printheads must be properly set about the axis through the printhead and perpendicular to the faceplate of the printhead as noted above. Methods that operate the motors connected to the printheads, such as motors 412 in FIG. 4, to orient the printhead properly about this axis are well known. By intentionally operating the actuators 412 so the nozzles of the printheads are not symmetrical about the above-described axis, then repeatable errors occur in the placement of the ink drops ejected from the printhead. This repeatable error provides a signature within the image content of the printed document that can act as a security feature. This signature can be detected, but not easily copied, because the errors do not align well with a 1200 dpi grid of pixels in the cross-process direction.

In a printer that has had the printheads of each printhead module intentionally rotated by the same amount, the location of the pixels vary from the positions where they would have landed if the printheads had been rotated to eject the pixels in a straight line across the cross-process direction. Since the printheads are formed with multiple rows of inkjets that extend in the cross-process when aligned in the cross-process direction, the signature of the pixels formed by the printheads intentionally rotated out of cross-process direction alignment provides a known frequency response of the signature. Deviations from a best fit line of the pixel positions can be used to identify a residual error. These deviations can be determined from an image scan of a printed document. Even though the scans are generated using a 600 or 1200 dpi grid, the location of the pixels can be inferred from the gray edges of the lines in the scan.

Figure 4:
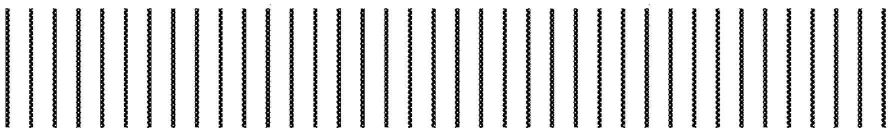
FIG. 4 depicts a line target that can be printed in a document at a predetermined spacing.
Figure 5:
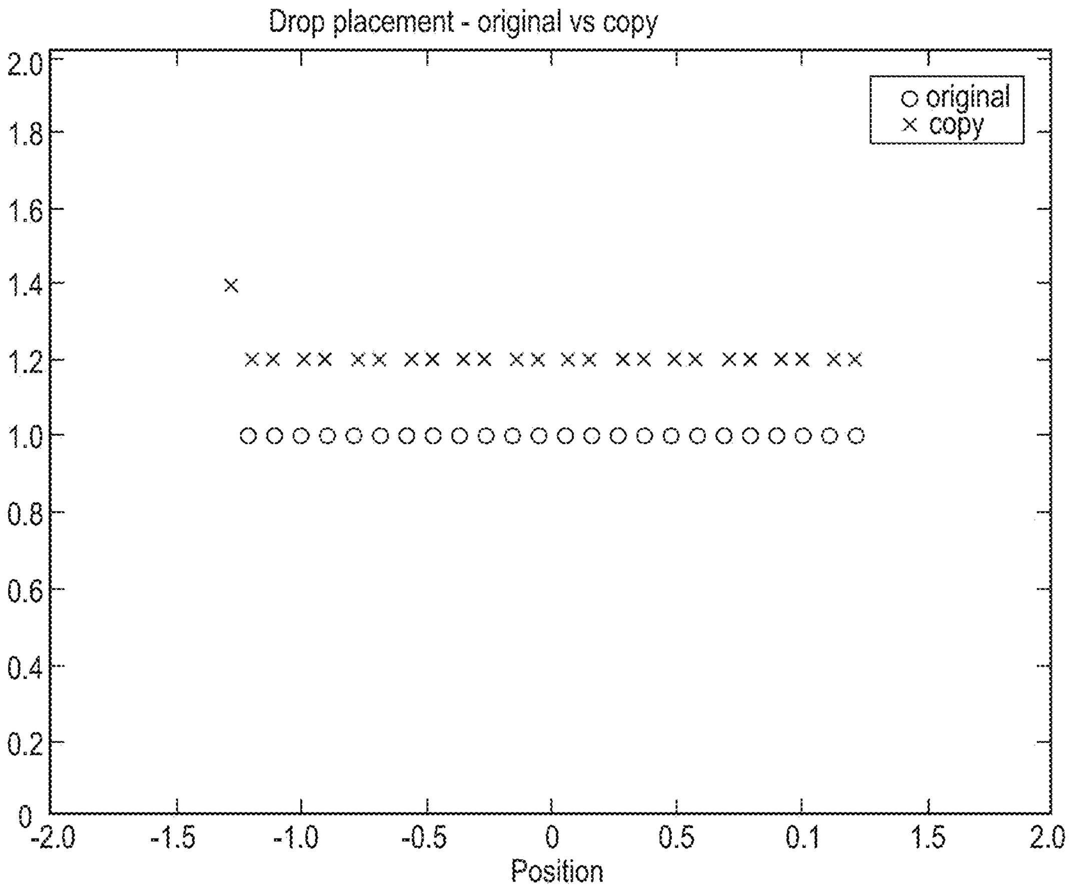
FIG. 5 depicts the positions of the pixels of the line target of FIG. 4 without printhead rotation and with printhead rotation.

Production of the security features using this method includes two steps. First, a line target, such as the one shown in FIG. 4, is printed in an ink image at a given spacing. As used in this document, the term "line target" means an arrangement of lines extending in the process direction printed in the image content of a document. In the exemplary target shown in FIG. 4, every fifth inkjet is operated a predetermined number of times to form a line in the process direction that extends at least a few millimeters. As shown in FIG. 5, if the line target of FIG. 4 is printed by the inkjets of printheads that have been intentionally rotated out of alignment in the cross-process direction, then the line of o's is produced. In this example, the printheads have been rotated by 500 μradians from the position where the inkjets in each row of inkjets in the printhead are aligned in the cross-process direction. In order to form an appropriate signature in a printed document without visibly distorting the printed document, the printheads should be rotated by at least 300 μradians and by no more than 2000 μradians for known printhead topologies. Printhead parameters can affect this range for a printhead, such as, the distance between the first row of inkjets and the last row of inkjets in the printhead. If a copy of the printed line is made, then the pixels in the lines are quantized to a 1200 dpi grid for printing and the copy shows the pixels in the locations shown by the x's in FIG. 5.

Figure 6A:
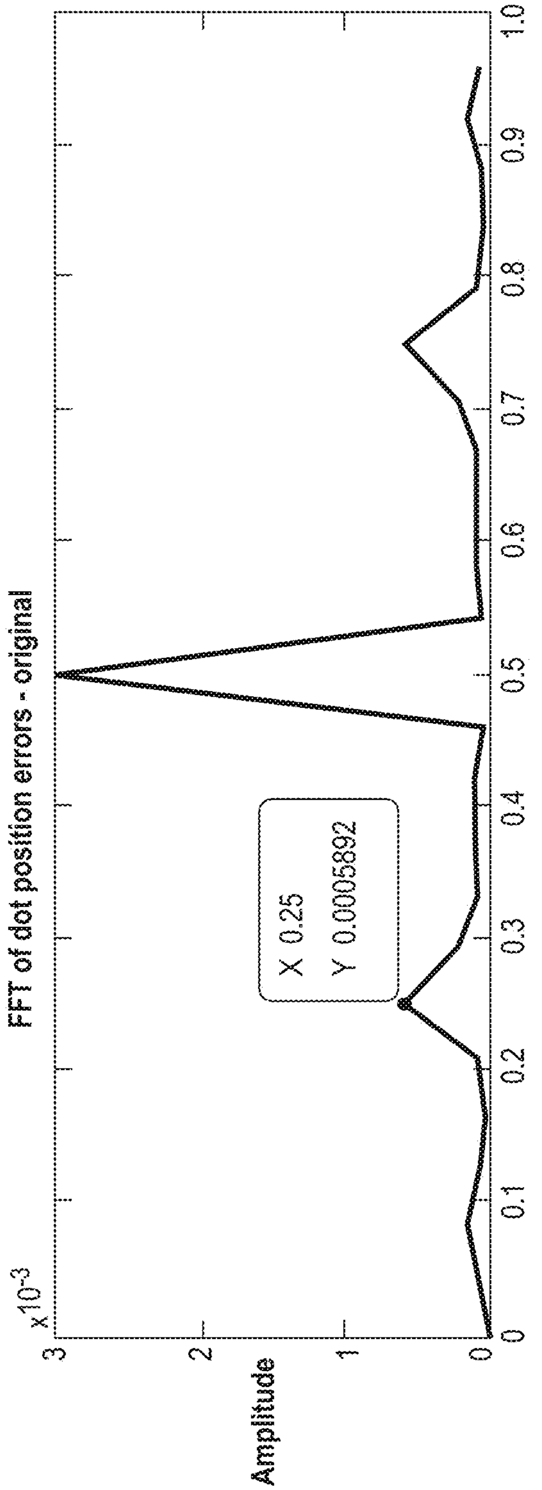
FIG. 6A shows the Fast Fourier Transform (FFT) of the printed line target in an original document and FIG. 6B shows the FFT of the printed line target in a copy of the document.
Figure 6B:
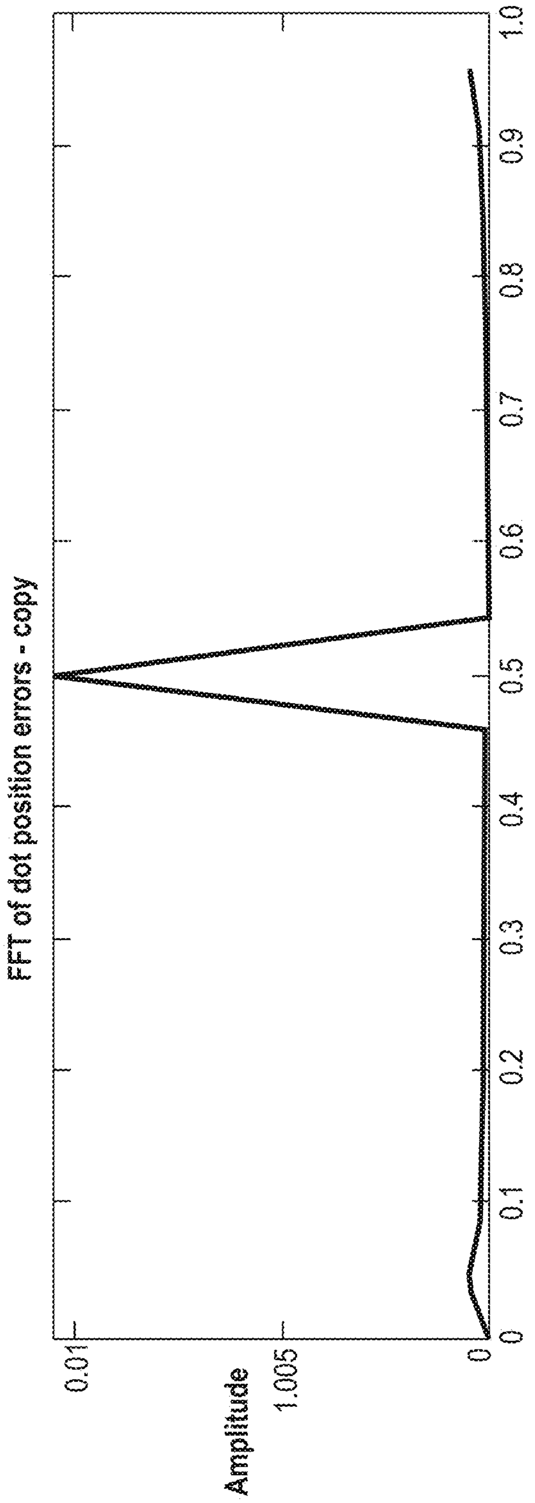

To determine whether a printed document is an original produced by the inkjet printer 10 or a copy produced by a copier, the printed document is scanned using an inline or flatbed scanner. The resulting image is analyzed with knowledge that the positional deviations of the line locations from a best line fit are different for the original and the copy. As used in this document, the term "best line fit" means a straight line that minimizes the distance between the straight line and the image content data used to form the line. FIG. 6A and FIG. 6B show FFTs of the deviations of the line targets for the original and a copy, respectively. Both the original and the copy have a significant amplitude peak at one-half of the Nyquist frequency, that is, one-half the frequency of the line target for their deviation plots, but only the original has a harmonic peak at one-quarter and three-quarters the Nyquist frequency. These additional peaks arise because the copy has lost those frequencies by quantizing the locations. Additionally, the copy has an increased contribution of the Nyquist component from the quantization performed by the copier. While relying on the absolute FFT of the positional deviations is less reliable, the ratio of the amplitudes at two different frequencies is more repeatable and different, so separating these two occurrences is straight forward.

Using FFT analysis on a scanned copy of a document can verify that the copy did not occur from a non-gridded set of lines. This analysis cannot be done in the printer of the original document via digital image manipulation, but only by changing the output grid locations to be non-equally spaced by rotation. Digital manipulation means adding pixels of one or more colors to form a security feature or changing the halftone stochastic pattern used to identify pixels for an ink image. Thus, producing the original from a copy of the original that has been digitally manipulated, even if the original digital image is known, is impossible because the end user does not know the configuration of the printer that produced the original.

The example discussed above shows how an embedded line target can be introduced into a document print by carefully choosing the line spacing and the amount of printhead rotation. The only requirement is to make the printhead rotation large compared to the amount of deviation from a best line fit. In the example shown above, 500 μradians, was used since it is an order of magnitude larger than the rotation placement accuracy of the printhead with reference to the motion of the media past stationary printheads or with reference to the motion of the printhead in printers where the printheads traverse the width of the media to print a line of an image. This target line in the original image data leaves no residual signature in the printed image since the lines are evenly spaced on the printed media.

Given that different versions of line targets can be easily detected by the method described above, three or more line targets can be chosen that are well spaced in their FFT responses so they can be easily distinguished. Since yellow pixels are more difficult to detect in document images because yellow does not contrast well with light media, which is the more common media color, $(3)^3$ or 27 unique combinations of printhead rotations in three printhead modules ejecting the three more easily detected colors can be effectively used to print documents with security features. If more easily separable combinations can be found the number of possible combinations grows cubically since three different colors of pixels are used in this example.

Figure 12:
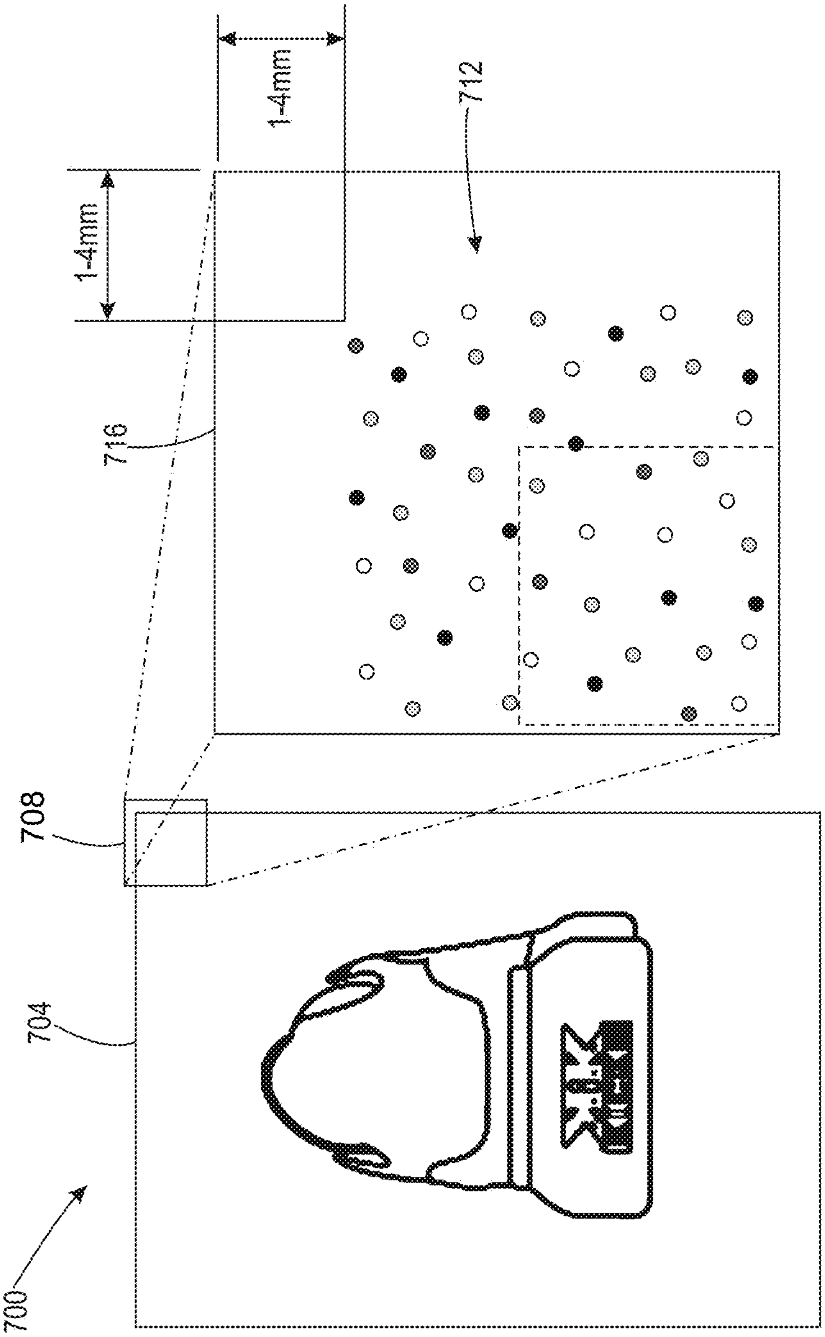
FIG. 12 Prior Art
FIG. 12 depicts a sneeze pattern formed by a prior art inkjet printer.

An alternative embodiment of the printer 10 calibrates the printheads in the printhead modules so the inkjets in each row of the printheads are aligned in the cross-process direction. To form a security feature in a printed document, a digital manipulation technique is used in the formation of a sneeze pattern used to maintain the operational status of the inkjets in the printer. A sneeze pattern is printed in the ink image of a document to maintain the operational status of the inkjets. To form sneeze patterns in documents, each inkjet in each printhead is periodically operated to eject single drops from each nozzle in some prescribed pattern onto a printed page. This pattern is designed to be below the visibility threshold of the viewer. If the pattern is too dense, the customer finds the print objectionable, if the pattern is not dense enough, the firing frequency of the inkjets may be insufficient to maintain the operational status of the inkjets. This method of maintaining inkjet operational status during printing is typically referred to as "sneezing" or "background jetting." As used in this document, the term "sneeze drop" or "sneeze drop ejection" refers to non-image ink drops ejected by identified inkjets to maintain the operational status of the inkjets in the printer. As used in this document, the term "sneeze pattern" means an arrangement of sneeze drops printed in the background of an ink image and the term "background" means areas of a printed document containing pixels that were not generated from the ink image content data. A method of printing sneeze pattern is disclosed in co-pending U.S. patent application Ser. No. 16/704,370, which is entitled "Methods For Operating Printhead Inkjets To Attenuate Ink Drying In The Inkjets During Printing Operations," which was filed on Dec. 5, 2019, the entirety of which is hereby expressly incorporated in this application by reference. Such a sneeze pattern is shown in FIG. 12. A corner portion 708 of an image area 704 for a media sheet 700 is enlarged to the right of the sheet 700. A portion 712 of the uniform sneeze pattern is depicted in the image area 704 of sheet 700. To reduce small registration errors, unwanted image artifacts, and machine contamination, printers are configured to leave an unprinted perimeter 716 around the image area of the media sheet as a buffer. This unprinted perimeter is typically about 1 mm to about 4 mm wide and it appears at the leading edge, trailing edge, left edge and right edge of the image area.

In the alternative embodiment of an inkjet printer that prints security features, a sneeze pattern is altered to encode a security feature that is identifiable via current scanner technology by inserting a permutation of the sneeze pattern with respect to the distance from the intended locations of the sneeze pattern prior to its printing. Moving the pixels of the sneeze pattern by a predetermined distance within certain areas of the ink image produces a known, scannable pattern in the background of the document that can be used as a security feature.

Sneeze patterns currently generated place sparse drops across the printed image such that specific colors are separated by a distance sufficient to prevent them from being observable by a human observer. The generation of the sneeze pattern also manages the separation between different ink colors, which in a typical inkjet printer are cyan, magenta, yellow, and black (CMYK), so a human observer does not notice the image background having a perceptible hue. Finally, the sneeze pattern is generated so the amount of ink each nozzle fires meets the requirements for keeping each inkjet operational. The generated sneeze pattern is repeated down the length of a page in the process direction.

Figure 7:
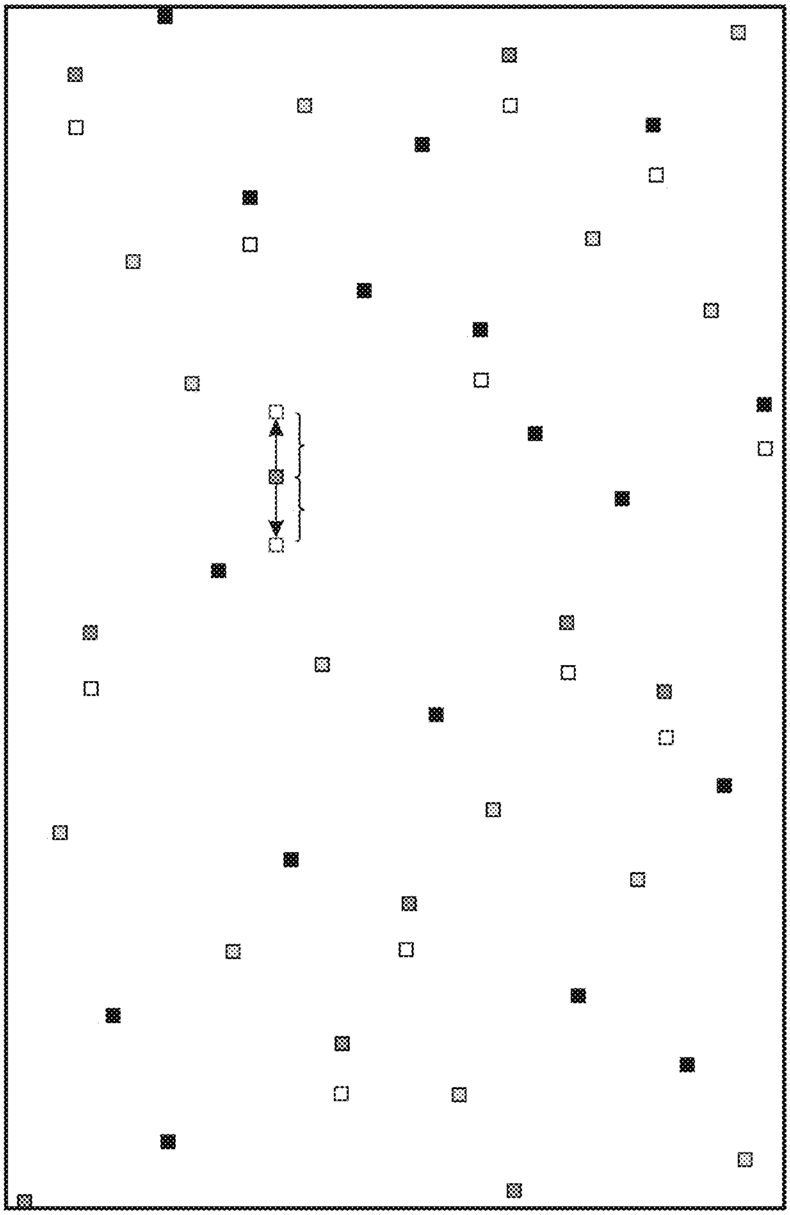
FIG. 7 depicts a sneeze pattern in which pixels have been moved laterally to form a security feature.

This known method of generating a sneeze pattern can be altered so that a specific, identifiable pattern exists on each page that can be used for security purposes. Each background drop or pixel is moved a predetermined distance from the location it occupies in the generated sneeze pattern. For example, a given set of pixels in a sneeze pattern generated by a known method are offset in the cross-process direction by the distance between adjacent nozzles, which is the minimum resolution of distance units in a printhead. This altered pattern is repeated across the complete image or it is repeated over an area having a predetermined size and then this area is repeated throughout regions of the printed image. FIG. 7 shows an example of how cyan drops in a sneeze pattern are moved laterally to form a security feature. Lateral shifts of pixels are used when the printhead moves across the media being printed laterally. The shift must be larger than the accuracy for determining pixel position in the image data of a printed pattern. For example, if the position of a pixel can be pinpointed to within three pixel positions, then the shift should be at least twice that accuracy or six pixels to ensure the frequency response to the shifted pattern is detectable. The shift of these drops shown in the figure can be identified by viewing an image of the printed document generated by a conventional scanner. The sneeze pattern can be permutated with respect to a single color in the pattern, across a number of colors in the pattern, the position of pixels in the generated pattern as discussed with regard to the example presented above, and by repeating multiple times in the printed image an area of the sneeze pattern that has been altered as previously noted.

Figure 8:
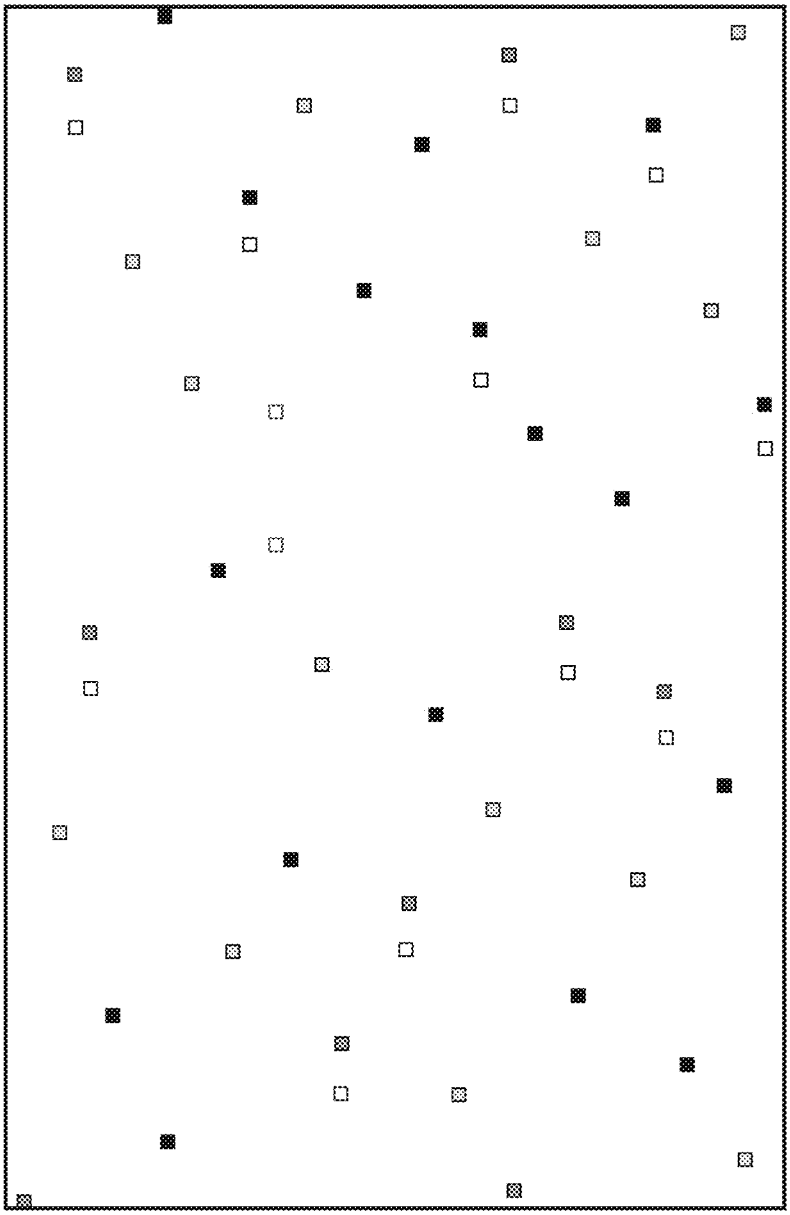
FIG. 8 depicts a sneeze pattern prior to shifting pixels to form a security feature.
Figure 9:
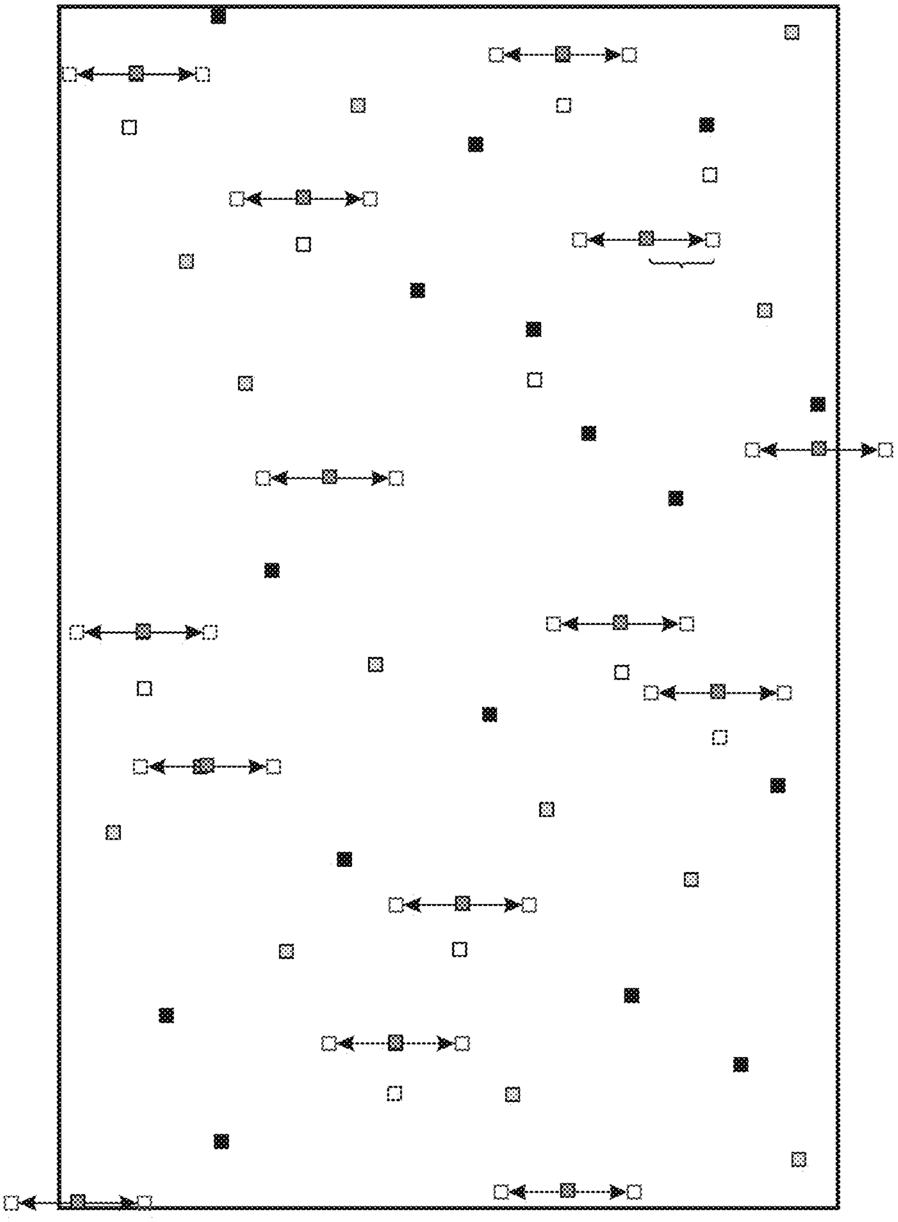
FIG. 9 depicts the shifting of some of the yellow, magenta, and cyan pixels in FIG. 8 to form a security feature.

One implementation of this method leaves the positions of the pixels for one of the four color planes in a sneeze pattern, black for example, in their expected locations, as shown in FIG. 8 and then shift one or more of the pixels for the other color planes, such as cyan, magenta, and yellow, as shown in FIG. 9. The shifted color plane(s) are moved +/−a predetermined number of pixels in the direction in which the media moves past the printheads since the printheads are stationary in this embodiment. Thus, some of the regularly spaced pixels in the sneeze pattern are now non-regularly spaced by advancing or delaying the time of ejection for those pixels in the image as the media moves past the printheads. This altered sneeze pattern image is formed within the printed image with the predetermined number of pixels being shifted +/−a predetermined number of pixel positions to enable the shifted sneeze pattern data to be encoded in the image. This shift is easily detectable in a digital image of the original printed sheet with a scanner; however, a copier is not capable of reproducing the non-regularly spaced pixels in the sneeze pattern since it is imperceptible to a human user so a copy of the printed document with the altered sneeze pattern does not reproduce the altered sneeze pattern. If the altered sneeze pattern is not detected, then the document is a copy.

Figure 10:
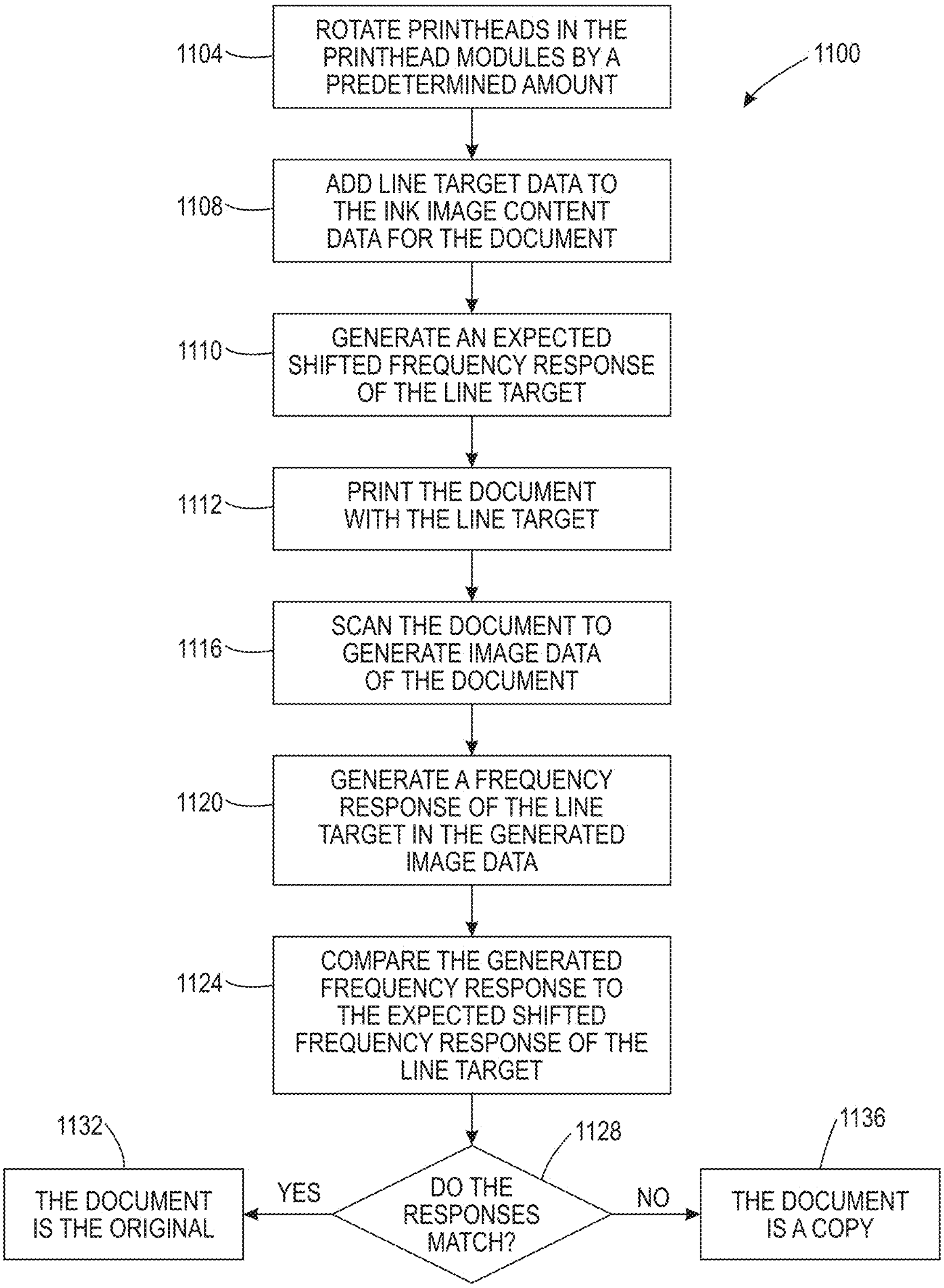
FIG. 10 is a flow diagram of a process for forming a security feature with rotated printheads.

A process 1100 for generating a rotated signature within a printed document in an inkjet printer is shown in FIG. 10. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

The process 1100 begins with the controller operating the actuators operatively connected to the printheads in the printhead modules to rotate the printheads by a predetermined amount (block 1104). Digital data corresponding to a line target is then added to the ink image content data for a document (block 1108) and an expected shifted frequency response of the line target in the document printed with the rotated printheads is generated (block 1110). The document is then printed (block 1112). A scan of the printed document is conducted to generate image data of the (block 1116) and a frequency response of the line target in the image data generated by the scanner is generated (block 1120). The frequency response of the line target in the image data is compared to the expected shifted frequency response of the line target printed with an inkjet printer having the rotated printheads (block 1124). If the responses match (block 1128), then the printed document is the original (block 1132). Otherwise, the printed document is a copy (block 1136).

Figure 11:
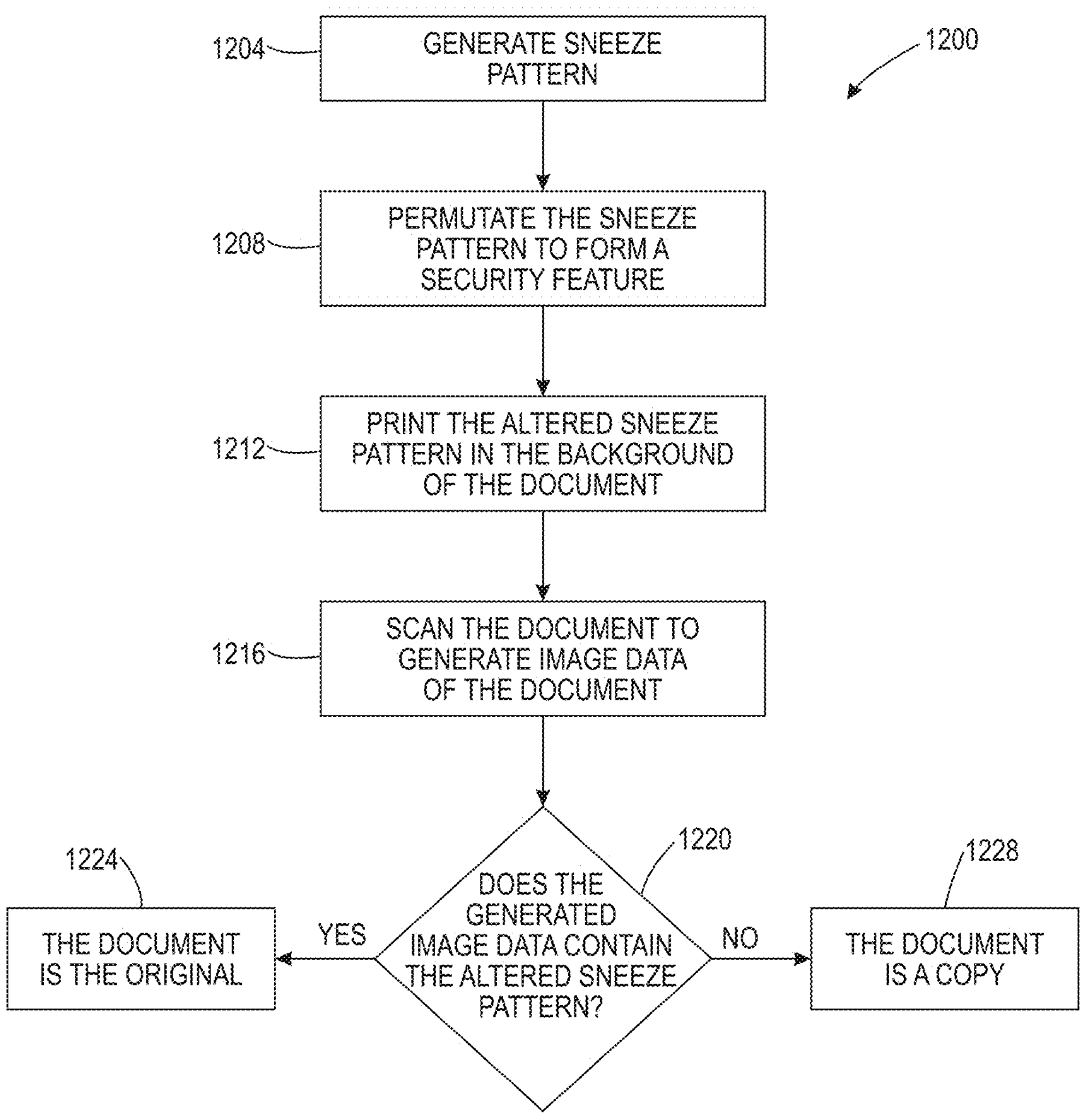
FIG. 11 is a flow diagram of a process for forming a security feature with shifted pixels in a sneeze pattern.

A process 1200 for printed an altered sneeze pattern as a security feature within a printed document in an inkjet printer is shown in FIG. 11. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

The process 1200 begins with the generation of a sneeze pattern for a media sheet (block 1204). The sneeze pattern can be generated by one of the methods in the application expressly incorporated in this application by reference above or another known method. This sneeze pattern is altered by permutating the sneeze pattern using the one of the permutations discussed previously (block 1208). The altered sneeze pattern and the ink image content data for a media sheet are used to operate the inkjets to form an ink image and the altered sneeze pattern on the media sheet (block 1212). The printed sheet can then be scanned (block 1216) and, if the digital data corresponding to the scanned document contains the altered sneeze pattern (block 1220), the printed document is the original (block 1224). Otherwise, it is a copy (block 1228).

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. A method of detecting an original document comprising:

printing a line target in an ink image of the original document on media with at least one printhead that has been rotated so rows of inkjets in the at least one printhead are not aligned in a direction of movement during printing of the line target;

generating an expected frequency response of the line target;

generating image data of a document;

generating a frequency response of the line target in the image data of the document; and identifying the document as the original document when the frequency response of the line target in the image data of the document equals the expected frequency response of the line target.

2. The method of claim 1 wherein the direction of movement is a direction of the at least one printhead across the media as lines are printed on the media.

3. The method of claim 1 wherein the at least one printhead is stationary and the direction of movement is a direction of the media passing the stationary at least one printhead.

4. The method of claim 3, the printing of the line target further comprising:

printing a plurality of lines with the at least one printhead that has been rotated, the plurality of lines extending in the direction of media passing the stationary at least one printhead.

5. The method of claim 4 wherein an amount of rotation of the at least one printhead is at least an order of magnitude larger than an amount of deviation of the lines from a best line fit.

6. The method of claim 5 wherein the at least one printhead is rotated by 500 μradians from a position where the rows of inkjets in the at least one printhead are aligned in the direction of the movement of the media past the stationary at least one printhead.

7. The inkjet printer of claim 1 wherein the at least one printhead is stationary and the direction of movement is a direction of the media passing the stationary at least one printhead.

8. The inkjet printer of claim 7, the controller being further configured to print the line target by:

printing a plurality of lines with the at least one printhead that has been rotated, the plurality of lines extending in the direction of media passing the stationary at least one printhead.

9. The inkjet printer of claim 8 wherein an amount of rotation of the at least one printhead is at least an order of magnitude larger than an amount of deviation of the lines from a best line fit.

10. The inkjet printer of claim 9 wherein the at least one printhead is rotated by 500 μradians from a position where the rows of inkjets in the at least one printhead are aligned in the direction of movement of the media past the stationary at least one printhead.

11. An inkjet printer comprising:

a media transport configured to carry media sheets through the inkjet printer;

at least one printhead that has been rotated so rows of inkjets in the at least one printhead are not aligned in a direction of movement during printing of the line target and the at least one printhead is configured to eject ink drops onto the media sheets;

a controller operatively connected to the at least one printhead, the controller being configured to:

print a line target in an ink image of an original document on media with the at least one printhead;

generate an expected frequency response of the line target;

generate image data of a document;

generate a frequency response of the line target in the image data of the document; and identify the document as the original document when the frequency response of the line target in the image data of the document equals the expected frequency response of the line target.

12. The inkjet printer of claim 11 wherein the direction of movement is a direction of the at least one printhead across the media as lines are printed on the media.

13. A method of detecting an original document comprising:

generating a sneeze pattern having a plurality of color separations;

modifying a portion of the sneeze pattern by altering positions of pixels within the generated sneeze pattern;

printing the original document with the sneeze pattern having the modified portion in the background of the original document;

generating image data of a document; and identifying the document as the original document when the modified portion of the generated sneeze pattern is detected in the background of the document.

14. The method of claim 13, the modification of the portion of the sneeze pattern further comprising:

changing a position of at least one pixel in at least one color separation of the sneeze pattern in a cross-process direction.

15. The method of claim 14 further comprising:

changing positions of a plurality of pixels in a plurality of color separations of the sneeze pattern in a cross-process direction.

16. The method of claim 13, the modification of the portion of the sneeze pattern further comprising:

changing a position of at least one pixel in at least one color separation of the sneeze pattern in a process direction.

17. The method of claim 16 further comprising:

changing positions of a plurality of pixels in a plurality of color separations of the sneeze pattern in a cross-process direction.

18. An inkjet printer comprising:

a media transport configured to carry media sheets through the inkjet printer;

at least one printhead configured to eject ink drops onto the media sheets as the media sheets pass the at least one printhead;

a controller operatively connected to the at least one printhead, the controller being configured to:

generate a sneeze pattern having a plurality of color separations;

modify a portion of the sneeze pattern by altering positions of pixels within the generated sneeze pattern;

print an original document with the sneeze pattern having the modified portion in a background of the original document;

generate image data of a document; and identify the document as the original document when the modified portion of the generated sneeze pattern is detected in the background of the document.

19. The inkjet printer of claim 18, the controller being further configured to:

change a position of at least one pixel in at least one color separation of the sneeze pattern in a cross-process direction.

20. The inkjet printer of claim 19, the controller being further configured to:

change positions of a plurality of pixels in a plurality of color separations of the sneeze pattern in a cross-process direction.

21. The inkjet printer of claim 18, the controller being further configured to:

change a position of at least one pixel in at least one color separation of the sneeze pattern in a process direction.

22. The inkjet printer of claim 21, the controller being further configured to:

change positions of a plurality of pixels in a plurality of color separations of the sneeze pattern in a process direction.

* * * * *